(12) United States Patent
Izumisawa et al.

(10) Patent No.: US 11,698,984 B2
(45) Date of Patent: Jul. 11, 2023

(54) INFORMATION PROCESSING DEVICE, MANAGEMENT DEVICE, AND NON-TRANSITORY COMPUTER READABLE MEDIUM

(71) Applicant: FUJIFILM Business Innovation Corp., Tokyo (JP)

(72) Inventors: Yusuke Izumisawa, Kanagawa (JP); Kota Matsuo, Kanagawa (JP); Mami Yokohashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 449 days.

(21) Appl. No.: 16/847,650

(22) Filed: Apr. 13, 2020

(65) Prior Publication Data

US 2021/0103670 A1 Apr. 8, 2021

(30) Foreign Application Priority Data

Oct. 4, 2019 (JP) .................................. 2019-184122

(51) Int. Cl.
*G06F 21/60* (2013.01)
*G06F 21/44* (2013.01)
*G06F 9/54* (2006.01)

(52) U.S. Cl.
CPC ............ *G06F 21/606* (2013.01); *G06F 9/542* (2013.01); *G06F 21/44* (2013.01)

(58) Field of Classification Search
CPC ...... G06F 21/606; G06F 21/44; G06F 21/121; G06F 9/542; G06F 16/275
See application file for complete search history.

(56) References Cited

U.S. PATENT DOCUMENTS

| | | | |
|---|---|---|---|
| 2012/0311091 A1* | 12/2012 | Dingler | G06F 21/10 709/219 |
| 2015/0227605 A1* | 8/2015 | Kimura | G06F 16/275 707/624 |
| 2017/0063805 A1* | 3/2017 | Mishra | G06F 8/654 |
| 2018/0245979 A1* | 8/2018 | Park | G01J 3/50 |

FOREIGN PATENT DOCUMENTS

| | | |
|---|---|---|
| JP | 2007305064 | 11/2007 |
| JP | 2013182292 | 9/2013 |
| JP | 6086124 | 3/2017 |

* cited by examiner

*Primary Examiner* — Nelson S. Giddins
(74) *Attorney, Agent, or Firm* — JCIPRNET

(57) ABSTRACT

An information processing device not connected to a communication line includes a processor configured to generate information on each specific processing repeatedly executed, the information being to be managed by a management device, and refer to management information indicating information already managed by the management device, and output information which is among the generated information and not yet managed by the management device.

10 Claims, 11 Drawing Sheets

FIG. 8

| DETAILS OF PROCESSING | INFORMATION PROCESSING DEVICE | | | MEDIATION DEVICE | MANAGEMENT SERVER | |
|---|---|---|---|---|---|---|
| | REFERENCE GENERATION DATE/TIME | DATE/TIME OF EXECUTION OF COLOR EVALUATION PROCESSING | GENERATION DATE/TIME OF COLOR EVALUATION FILE TO BE OUTPUTTED | GENERATION DATE/TIME OF OUTPUTTED COLOR EVALUATION FILE | REFERENCE GENERATION DATE/TIME | GENERATION DATE/TIME OF COLOR EVALUATION FILE TO BE MANAGED |
| OUTPUT PROCESSING : FIRST TIME | 9/3/2019 10:00 | 9/4/2019 10:00<br>9/5/2019 10:00<br>9/6/2019 10:00 | 9/4/2019 10:00<br>9/5/2019 10:00<br>9/6/2019 10:00 | 9/4/2019 10:00<br>9/5/2019 10:00<br>9/6/2019 10:00 | 9/3/2019 10:00 | 9/4/2019 10:00<br>9/5/2019 10:00<br>9/6/2019 10:00 |
| OUTPUT PROCESSING : SECOND TIME | 9/3/2019 10:00 | 9/4/2019 10:00<br>9/5/2019 10:00<br>9/6/2019 10:00<br>9/7/2019 10:00<br>9/8/2019 10:00 | 9/4/2019 10:00<br>9/5/2019 10:00<br>9/6/2019 10:00<br>9/7/2019 10:00<br>9/8/2019 10:00 | 9/4/2019 10:00<br>9/5/2019 10:00<br>9/6/2019 10:00<br>9/7/2019 10:00<br>9/8/2019 10:00 | 9/6/2019 10:00 | 9/7/2019 10:00<br>9/8/2019 10:00 |
| LICENSE ISSUANCE REQUEST | 9/8/2019 10:00 | — | — | — | 9/8/2019 10:00 | — |
| OUTPUT PROCESSING : THIRD TIME | 9/8/2019 10:00 | 9/4/2019 10:00<br>9/5/2019 10:00<br>9/6/2019 10:00<br>9/7/2019 10:00<br>9/8/2019 10:00<br>9/8/2019 17:00<br>9/9/2019 13:00<br>9/9/2019 17:00 | 9/8/2019 17:00<br>9/9/2019 13:00<br>9/9/2019 17:00 | 9/8/2019 17:00<br>9/9/2019 13:00<br>9/9/2019 17:00 | 9/8/2019 10:00 | 9/8/2019 17:00<br>9/9/2019 13:00<br>9/9/2019 17:00 |

FIG. 9

| DETAILS OF PROCESSING | INFORMATION PROCESSING DEVICE | | | MEDIATION DEVICE | MANAGEMENT SERVER | |
|---|---|---|---|---|---|---|
| | REFERENCE GENERATION DATE/TIME | DATE/TIME OF EXECUTION OF COLOR EVALUATION PROCESSING | GENERATION DATE/TIME OF COLOR EVALUATION FILE TO BE OUTPUTTED | GENERATION DATE/TIME OF OUTPUTTED COLOR EVALUATION FILE | REFERENCE GENERATION DATE/TIME | GENERATION DATE/TIME OF COLOR EVALUATION FILE TO BE MANAGED |
| OUTPUT PROCESSING : FIRST TIME | 9/3/2019 10:00 | 9/4/2019 10:00<br>9/5/2019 10:00<br>9/6/2019 10:00 | 9/4/2019 10:00<br>9/5/2019 10:00<br>9/6/2019 10:00 | — | 9/3/2019 10:00 | — |
| OUTPUT PROCESSING : SECOND TIME | 9/3/2019 10:00 | 9/4/2019 10:00<br>9/5/2019 10:00<br>9/6/2019 10:00<br>9/7/2019 10:00<br>9/8/2019 10:00 | 9/4/2019 10:00<br>9/5/2019 10:00<br>9/6/2019 10:00<br>9/7/2019 10:00<br>9/8/2019 10:00 | 9/4/2019 10:00<br>9/5/2019 10:00<br>9/6/2019 10:00<br>9/7/2019 10:00<br>9/8/2019 10:00 | 9/3/2019 10:00 | 9/4/2019 10:00<br>9/5/2019 10:00<br>9/6/2019 10:00<br>9/7/2019 10:00<br>9/8/2019 10:00 |
| OUTPUT PROCESSING : THIRD TIME | 9/3/2019 10:00 | 9/4/2019 10:00<br>9/5/2019 10:00<br>9/6/2019 10:00<br>9/7/2019 10:00<br>9/8/2019 10:00<br>9/8/2019 17:00<br>9/9/2019 13:00<br>9/9/2019 17:00 | 9/4/2019 10:00<br>9/5/2019 10:00<br>9/6/2019 10:00<br>9/7/2019 10:00<br>9/8/2019 10:00<br>9/8/2019 17:00<br>9/9/2019 13:00<br>9/9/2019 17:00 | 9/4/2019 10:00<br>9/5/2019 10:00<br>9/6/2019 10:00<br>9/7/2019 10:00<br>9/8/2019 10:00<br>9/8/2019 17:00<br>9/9/2019 13:00<br>9/9/2019 17:00 | 9/8/2019 10:00 | 9/8/2019 17:00<br>9/9/2019 13:00<br>9/9/2019 17:00 |

FIG. 10

| DETAILS OF PROCESSING | INFORMATION PROCESSING DEVICE | | | MEDIATION DEVICE | MANAGEMENT SERVER | |
|---|---|---|---|---|---|---|
| | REFERENCE GENERATION DATE/TIME | DATE/TIME OF EXECUTION OF COLOR EVALUATION PROCESSING | GENERATION DATE/TIME OF COLOR EVALUATION FILE TO BE OUTPUTTED | GENERATION DATE/TIME OF OUTPUTTED COLOR EVALUATION FILE | REFERENCE GENERATION DATE/TIME | GENERATION DATE/TIME OF COLOR EVALUATION FILE TO BE MANAGED |
| OUTPUT PROCESSING : FIRST TIME | 9/3/2019 10:00 | 9/4/2019 10:00<br>9/5/2019 10:00<br>9/6/2019 10:00 | 9/4/2019 10:00<br>9/5/2019 10:00<br>9/6/2019 10:00 | — | 9/3/2019 10:00 | — |
| OUTPUT PROCESSING : SECOND TIME | 9/3/2019 10:00 | 9/4/2019 10:00<br>9/5/2019 10:00<br>9/6/2019 10:00<br>9/7/2019 10:00<br>9/8/2019 10:00 | 9/4/2019 10:00<br>9/5/2019 10:00<br>9/6/2019 10:00<br>9/7/2019 10:00<br>9/8/2019 10:00 | 9/4/2019 10:00<br>9/5/2019 10:00<br>9/6/2019 10:00<br>9/7/2019 10:00<br>9/8/2019 10:00 | 9/3/2019 10:00 | 9/4/2019 10:00<br>9/5/2019 10:00<br>9/6/2019 10:00<br>9/7/2019 10:00<br>9/8/2019 10:00 |
| LICENSE ISSUANCE REQUEST | 9/8/2019 10:00 | — | — | — | 9/8/2019 10:00 | — |
| OUTPUT PROCESSING : THIRD TIME | 9/8/2019 10:00 | 9/4/2019 10:00<br>9/5/2019 10:00<br>9/6/2019 10:00<br>9/7/2019 10:00<br>9/8/2019 10:00<br>9/8/2019 17:00<br>9/9/2019 13:00<br>9/9/2019 17:00 | 9/8/2019 17:00<br>9/9/2019 13:00<br>9/9/2019 17:00 | 9/8/2019 17:00<br>9/9/2019 13:00<br>9/9/2019 17:00 | 9/8/2019 10:00 | 9/8/2019 17:00<br>9/9/2019 13:00<br>9/9/2019 17:00 |

FIG. 11

| DETAILS OF PROCESSING | INFORMATION PROCESSING DEVICE | | | MEDIATION DEVICE | MANAGEMENT SERVER | |
|---|---|---|---|---|---|---|
| | REFERENCE GENERATION DATE/TIME | DATE/TIME OF EXECUTION OF COLOR EVALUATION PROCESSING | GENERATION DATE/TIME OF COLOR EVALUATION FILE TO BE OUTPUTTED | GENERATION DATE/TIME OF OUTPUTTED COLOR EVALUATION FILE | REFERENCE GENERATION DATE/TIME | GENERATION DATE/TIME OF COLOR EVALUATION FILE TO BE MANAGED |
| OUTPUT PROCESSING : FIRST TIME | 9/3/2019 10:00 | 9/4/2019 10:00<br>9/5/2019 10:00<br>9/6/2019 10:00 | 9/4/2019 10:00<br>9/5/2019 10:00<br>9/6/2019 10:00 | — | 9/3/2019 10:00 | — |
| LICENSE ISSUANCE REQUEST | 9/3/2019 10:00 | — | — | — | 9/3/2019 10:00 | — |
| OUTPUT PROCESSING : SECOND TIME | 9/3/2019 10:00 | 9/4/2019 10:00<br>9/5/2019 10:00<br>9/6/2019 10:00<br>9/7/2019 10:00<br>9/8/2019 10:00 | 9/4/2019 10:00<br>9/5/2019 10:00<br>9/6/2019 10:00<br>9/7/2019 10:00<br>9/8/2019 10:00 | 9/4/2019 10:00<br>9/5/2019 10:00<br>9/6/2019 10:00<br>9/7/2019 10:00<br>9/8/2019 10:00 | 9/3/2019 10:00 | 9/4/2019 10:00<br>9/5/2019 10:00<br>9/6/2019 10:00<br>9/7/2019 10:00<br>9/8/2019 10:00 |

INFORMATION PROCESSING DEVICE, MANAGEMENT DEVICE, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-184122 filed on Oct. 4, 2019.

BACKGROUND

(i) Technical Field

The present disclosure relates to an information processing device, a management device, and a non-transitory computer readable medium.

(ii) Related Art

Japanese Unexamined Patent Application Publication No. 2013-182292 discloses a cloud system including a cloud, and a communication terminal which is connected to the cloud and transfers information to and from the cloud. The cloud system includes: a specification unit that, even when the connection is in a disconnected state, specifies folders storing information from the folders stored in the cloud, the information needing to be provided to the communication terminal; a selection unit that selects a folder needed by the communication terminal from the specified folders; and a saving unit that saves the selected folder in the communication terminal for a predetermined period.

Japanese Patent No. 6086124 discloses an information processing system including multiple information processing devices which share a storage device on a network. The information processing system synchronizes data between the storage device and each information processing device. The information processing device includes: a first storage that stores data and update information in association with each other, the update information indicating whether or not the data is updated after being synchronized with the storage device; a second storage that stores the most recent date/time when the data stored in the first storage is synchronized with data stored in the storage device; an obtaining unit that, when the storage device is synchronized with data, obtains from the storage device the most recent date/time when the storage device is synchronized with one of the multiple information processing devices; a synchronization execution unit that, when the most recent date/time obtained by the obtaining unit matches the most recent date/time stored in the second storage, synchronizes data with the update information updated with the storage device, and when the most recent date/time obtained by the obtaining unit does not match the most recent date/time stored in the second storage, and the data with the update information updated is present, transfers the data with the update information updated from the first storage to another storage, then synchronizes the data stored in the storage device with the data stored in the first storage.

Japanese Unexamined Patent Application Publication No. 2007-305064 discloses a file automatic update system in which a server and an information processing terminal are connected via a network. The server includes a unit that in response to a request from the information processing terminal, transmits any file stored in the server to the information processing terminal as a request source; and a unit that in response to a request from the information processing terminal, transmits last update date/time information to the information processing terminal as a request source, the last update date/time information indicating the time when any file stored in the server is updated last. The information processing terminal includes a unit that, when obtaining any file from the server, requests the server to transmit the last update date/time information of the file; a unit that stores any file obtained from the server and the last update date/time information in a storage unit in association with each other; a unit that, when any file obtained from the server is used or executed, requests the server for the last update date/time information of the file; a determination unit that, compares last update date/time information in association with the used or executed file with a newly obtained last update date/time information, and determines whether or not the used or executed file is the most recent file; and an automatic update unit that, when the determination unit determines that the used or executed file is not the most recent file, requests the server to transmit the used or executed file.

SUMMARY

A user may desire to transmit information from an information processing device not connected to a communication line to a management device connected to a communication line. In this case, for instance, the following approach is taken: information in the information processing device is stored in a recording medium such as a Universal Serial Bus (USB) memory, the information is transferred to a mediation device connected to the communication line via the recording medium, and the information is transmitted from the mediation device to the management device. However, since the information processing device not connected to a communication line is not connected to the management device via a communication line, it is not possible for the information processing device to determine whether or not the information to be transmitted by communicating with the management device is already transmitted to the management device.

Thus, in order to prevent incomplete transmission of the information to be transmitted to the management device, for instance, it is sufficient that all the information generated in the information processing device be transmitted to the management device. However, in this case, the information already transmitted is also collectively transmitted to the management device for each transmission, thus the amount of information to be transmitted to the management device is increased.

Aspects of non-limiting embodiments of the present disclosure relate to an information processing device, a management device, and a non-transitory computer readable medium that are capable of inhibiting an increase in the amount of information to be transmitted to the management device while preventing incomplete transmission of the generated information to the management device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device not connected to a communication line, the information processing device including a processor configured to generate information on each specific processing repeatedly executed, the information being to be managed by a management device, and refer to management information indicating information already managed by the management device, and output information which is among the generated information and not yet managed by the management device.

BRIEF DESCRIPTION OF THE DRAWINGS

Exemplary embodiment of the present disclosure will be described in detail based on the following figures, wherein:

FIG. 8 is a table illustrating a management situation example of color evaluation files;

FIG. 9 is a table illustrating a management situation example of color evaluation files when a license issuance request is not made;

FIG. 10 is a table illustrating a management situation example of color evaluation files when a user forgets to transmit a color evaluation file to the management server; and FIG. 11 is a table illustrating a management situation example of color evaluation files when a user forgets to transmit a color evaluation file to the management server, then a license issuance request is made.

DETAILED DESCRIPTION

Hereinafter, the present exemplary embodiment will be described with reference to the drawings. It is to be noted that the same symbol is labeled with the same components and the same processing through the entire drawing, and a redundant description is omitted.

Figure 1:
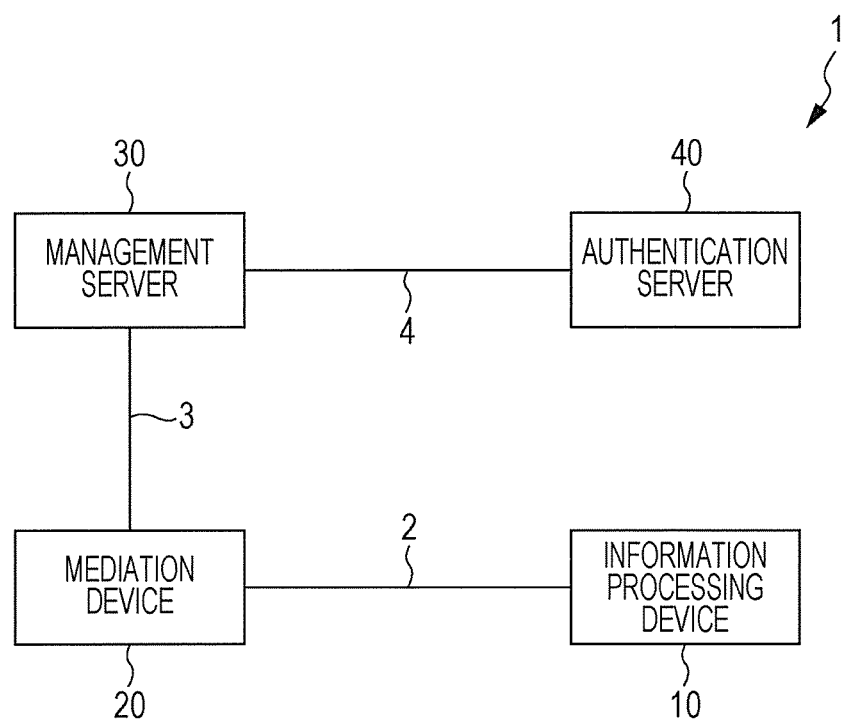
FIG. 1 is a diagram illustrating a system configuration example of an information processing system.

FIG. 1 is a diagram illustrating a system configuration example of an information processing system 1 according to the present exemplary embodiment, and the information processing system 1 includes an information processing device 10, a mediation device 20, a management server 30, and an authentication server 40.

The information processing device 10 and the mediation device 20 are devices operated by a user who utilizes the information processing device 10, for instance. The management server 30 and the authentication server 40 are devices operated by an administrator who manages the information processing device 10, and provides some services to users via the information processing device 10, for instance.

The respective installation sites for the information processing device 10, the mediation device 20, the management server 30, and the authentication server 40 are not restricted. However, for instance, the information processing device 10 and the mediation device 20 are installed in the same building, and the management server 30 and the authentication server 40 are installed in a building different from the building where the information processing device 10 and the mediation device 20 are installed, specifically, installed in a data center or the like. In addition, the mediation device 20 and the management server 30 at a remote site are connected by a public line which is an example of a communication line, such as the internet, to which an unspecified number of devices are connected.

The information processing device 10 is a device that provides a service to a user according to an instruction thereof. The type of the information processing device 10 is not restricted as long as the device provides services to a user. For instance, the information processing device 10 is an image forming device that provides an image forming service by which an image specified by a user is formed on a recording medium such as a sheet of paper.

In order to execute a service provided by the information processing device 10, an application that defines the processing corresponding to the service is necessary. As described later, execution of the application is permitted upon receiving license authentication from the management server 30. Specifically, execution of the application is permitted during a period before an expiration time indicated by a license received from the management server 30. On and after the expiration time, even when a user attempts to execute the application, control is performed so that the application is not started up. Thus, in order to utilize the application after the expiration time for the application, the information processing device 10 requests the management server 30 to issue a new license with an updated expiration time. As an example, the period before an expiration time for the application is set to one month. Needless to say, the period before an expiration time for the application may be set to a period other than one month.

Meanwhile, in order to prevent information leakage and falsification of data by unauthorized access from the outside, the information processing device 10 is not connected to a public line 3 to which an unspecified number of devices are connected, but is connected to an internal line 2 to which specific devices, such as devices managed by an organization to which a user belongs, are connected. Specifically, the internal line 2 is a closed communication line in a specific organization, such as a local area network (LAN) or an intranet, and connection to the communication line from any device outside the organization is not permitted. Thus, when the information processing device 10 transmits and receives information to and from the management server 30, the information is transmitted and received to and from the management server 30 through the mediation device 20.

The mediation device 20 is a device that mediates transmission and reception of information between the information processing device 10 and the management server 30. When the mediation device 20 mediates transmission and reception of information between the information processing device 10 and the management server 30, an operation of the mediation device 20 by a user is necessary. Specifically, when a user transmits information of the information processing device 10 to the management server 30, the user operates the mediation device 20 so that an authentication screen for the management server 30 is displayed, and inputs registered authentication information to the authentication screen, thereby notifying the management server 30 that the input is for a connection request from a user of the information processing device 10 managed by the management server 30. After authentication of the user is completed by the management server 30, the user selects information to be transmitted to the management server 30 from the information transmitted from the information processing device 10 to the mediation device 20 through the internal line 2, and the user presses a transmission button displayed on a transmission screen to transmit the selected information to the management server 30. On the other hand, when a user passes the information received from the management server 30 to the information processing device 10, the user operates the mediation device 20 to select information to be passed to the information processing device 10, then presses a transfer button displayed on a receiving screen to transfer the selected information to the information processing device 10 through the internal line 2.

Hereinafter, an example will be described, in which the information processing device 10 is connected to the mediation device 20 via the internal line 2. However, the information processing device 10 may be utilized in a single state (referred to as a "stand-alone" state) where the information processing device 10 is not connected to the internal line 2 and any communication line. In this case, a user may manually transfer information between the information processing device 10 and the mediation device 20 using a portable semiconductor memory, such as a USB memory or a memory card.

Although the information processing device 10 is connected to the internal line 2, when the information processing device 10 transmits and receives information in this manner to and from a device connected to the public line 3 to which an unspecified number of devices are connected, the information processing device 10 which needs an operation of a user on the mediation device 20 is referred to as the "information processing device 10 not connected to a communication line". Also, a state not connected to a communication line may be referred to as an "off-line state".

In the example of the information processing system 1 illustrated in FIG. 1, the information processing system 1 includes only one set of combination of the information processing device 10 and the mediation device 20. However, multiple combinations of the information processing device 10 and the mediation device 20 are installed at the sites where users utilize application, and respective mediation devices 20 are connected to the management server 30 via the public line 3.

The management server 30 is an example of a management device that manages the license for each application executed by the information processing device 10 as well as processing results of specific processing (hereinafter referred to as "specific processing") by the application during a period in which the application is executed by the information processing device 10.

When the information processing device 10 is an image forming device, the information processing device 10 repeatedly performs color evaluation processing during a period in which an application for forming an image is executed, the color evaluation processing being configured to evaluate how far the hue, brightness, and chroma of an image formed on a recording medium differ from the specified hue, brightness, and chroma, respectively. The management server 30 manages color evaluation results which are the results of the color evaluation processing in the information processing device 10, and transmits correction information to the information processing device 10, the correction information for performing color correction so that the color of an image formed on a recording medium by the information processing device 10 becomes closer to a specified color. It is to be noted that color correction may be performed by either the management server 30 or the information processing device 10.

The greater the number of color evaluation results, the easier to identify the tendency of color shift in the information processing device 10, thus the accuracy of the correction information is improved. Therefore, the management server 30 manages all the color evaluation results generated by the information processing device 10.

The color evaluation processing according to the present exemplary embodiment is an example of the specific processing, the color evaluation result outputted by the color evaluation processing is an example of information generated by the information processing device 10 as well as an example of information on the specific processing. The color evaluation result is generated as a file in accordance with a predetermined format, thus hereinafter referred to as the "color evaluation file".

The authentication server 40 is connected to the management server 30, for instance, via an internal line 4 which is a closed communication line in an organization to which an administrator who manages the management server 30 belongs. Authentication information is registered in the authentication server 40, and the authentication server 40 outputs an authentication result to the management server 30, the authentication result indicating whether or not authentication information received from the management server 30 matches the registered authentication information. Matching of the authentication information shows that the management server 30 has received a connection request from a user of the information processing device 10, the user having the license for the application managed by the management server 30.

Figure 2:
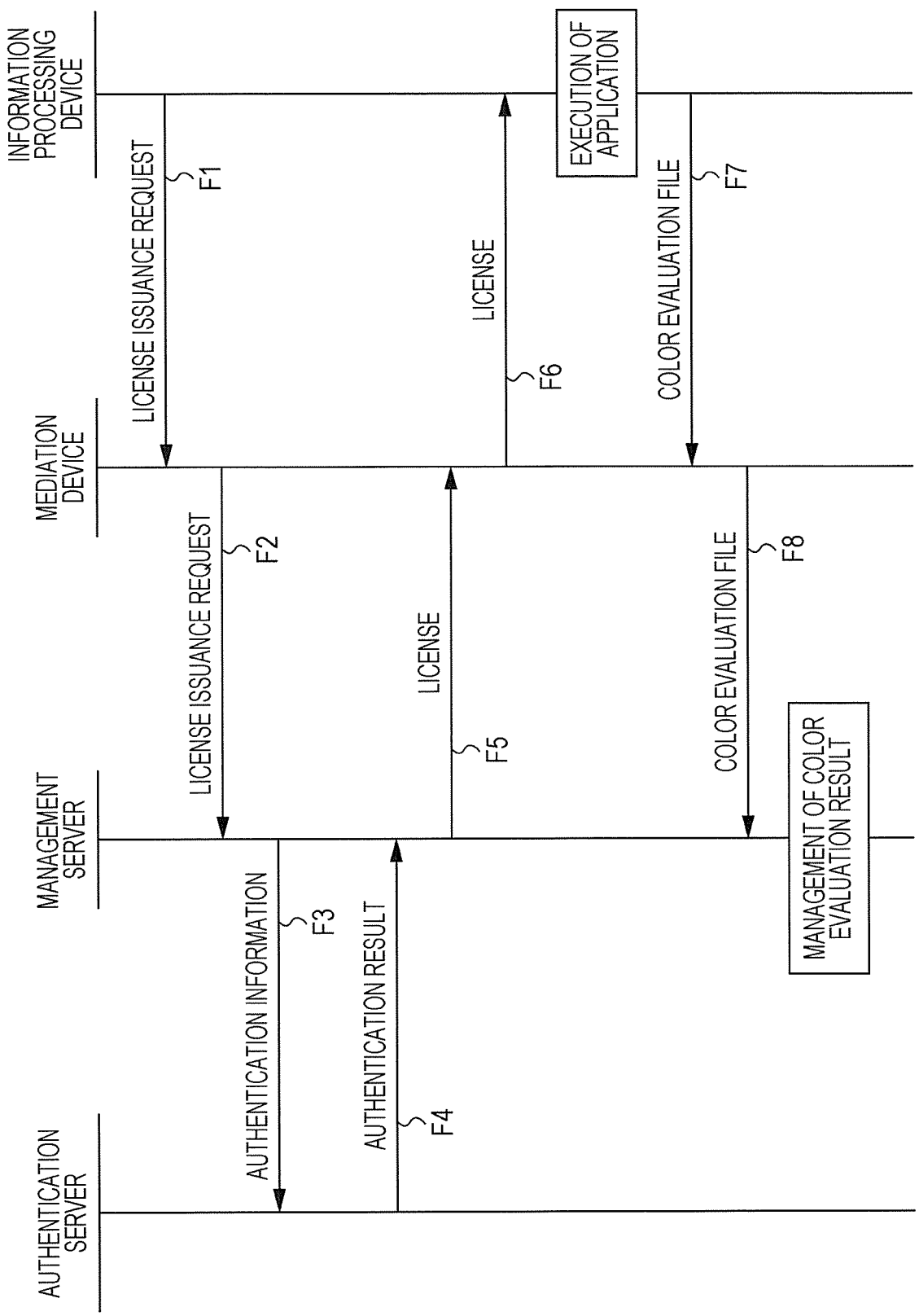
FIG. 2 is a sequence diagram illustrating an example of a flow of information in the information processing system.

FIG. 2 is a sequence diagram illustrating an example of fundamental transfer of information performed when the information processing device 10 utilizes an application.

In order to utilize an application, for instance, before the expiration time of the license, the information processing device 10 requests the management server 30 for a new license according to the expiration time of the license. Thus, the information processing device 10 transmits a license issuance request to the mediation device through the internal line 2 (see the sequence F1 of FIG. 2)

Upon receiving the license issuance request from the information processing device 10, the mediation device 20 transfers the authentication information for a user and the license issuance request to the management server 30 according to an operation of the user (see the sequence F2 of FIG. 2).

Upon receiving the authentication information, the management server 30 transfers the received authentication information to the authentication server 40 through the internal line 4 (see the sequence F3 of FIG. 2).

The authentication server 40 transmits an authentication result to the management server 30 through the internal line 4, the authentication result being for the authentication information received from the management server 30 (see the sequence F4 of FIG. 2).

Upon receiving the authentication result, when confirming that the license issuance request received from the mediation device 20 is from an information processing device 10 managed by the management server 30, by using the authentication result, the management server 30 generates a license which sets an expiration time for the application, and transmits the generated license to the mediation device 20 through the public line 3 (see the sequence F5 of FIG. 2).

It is to be noted that when the management server 30 generates a license, the management server 30 also sets the generation date/time of a color evaluation file in the license, the color evaluation file being generated by the information processing device 10 most recently among the color evaluation files already managed as a target for license issuance by the management server 30 and received from the information processing device 10, in other words, the most recent color evaluation file managed by the management server 30. The generation date/time of a color evaluation file is configurated by information on the hour, minute, second in addition to the year, month, date when the color evaluation file is generated.

Hereinafter, the most recent color evaluation file among the color evaluation files already managed by the management server 30 is referred to as the "reference color evaluation file", and the date/time when the reference color evaluation file is generated by the information processing device 10 is referred to as the "reference generation date/time". The reference generation date/time indicating the range of the color evaluation files managed by the management server 30 is an example of management information according to the present exemplary embodiment. The license issuance processing in the management server 30 will be described in detail later.

Upon receiving the license, the mediation device 20 transfers the received license to the information processing device 10 according to an operation of the user (see the sequence F6 of FIG. 2).

Upon receiving the license, the information processing device 10 sets an expiration time for the application included in the license. The setting of an expiration time for the application in the information processing device 10 is called "license registration", and execution of the application in the information processing device 10 is permitted by performing the license registration.

As described above, since the color evaluation processing is repeatedly executed during a period in which the information processing device 10 executes the application, the information processing device 10 transmits a color evaluation file, which has been generated by the color evaluation processing so far, to the mediation device 20 through the internal line 2 at the timing specified by a user (see the sequence F7 of FIG. 2). The information processing device 10 refers to the reference generation date/time notified by the license, and selects a color evaluation file to be transmitted to the mediation device 20. The output processing of a color evaluation file in the information processing device 10 will be described in detail later.

Upon receiving the color evaluation result from the information processing device 10, the mediation device 20 transfers the color evaluation result to the management server 30 according to an operation of the user (see the sequence F8 of FIG. 2).

Upon receiving the color evaluation file, the management server 30 manages the received color evaluation file. The management server 30 transmits color correction information to the information processing device 10 through the mediation device 20 at a predetermined timing, the color correction information being set based on the managed color evaluation file. The information processing device 10 corrects the color of an image formed on a recording medium in accordance with the color correction information received from the management server 30. Consequently, for instance, when the same image is formed even by another information processing device 10, an image with the same hue, brightness, and chroma is formed on a recording medium. Here, color correction may be performed by either the management server 30 or the information processing device 10.

The management processing performed for managing the color evaluation files in the management server 30 will be described in detail later.

Figure 3:
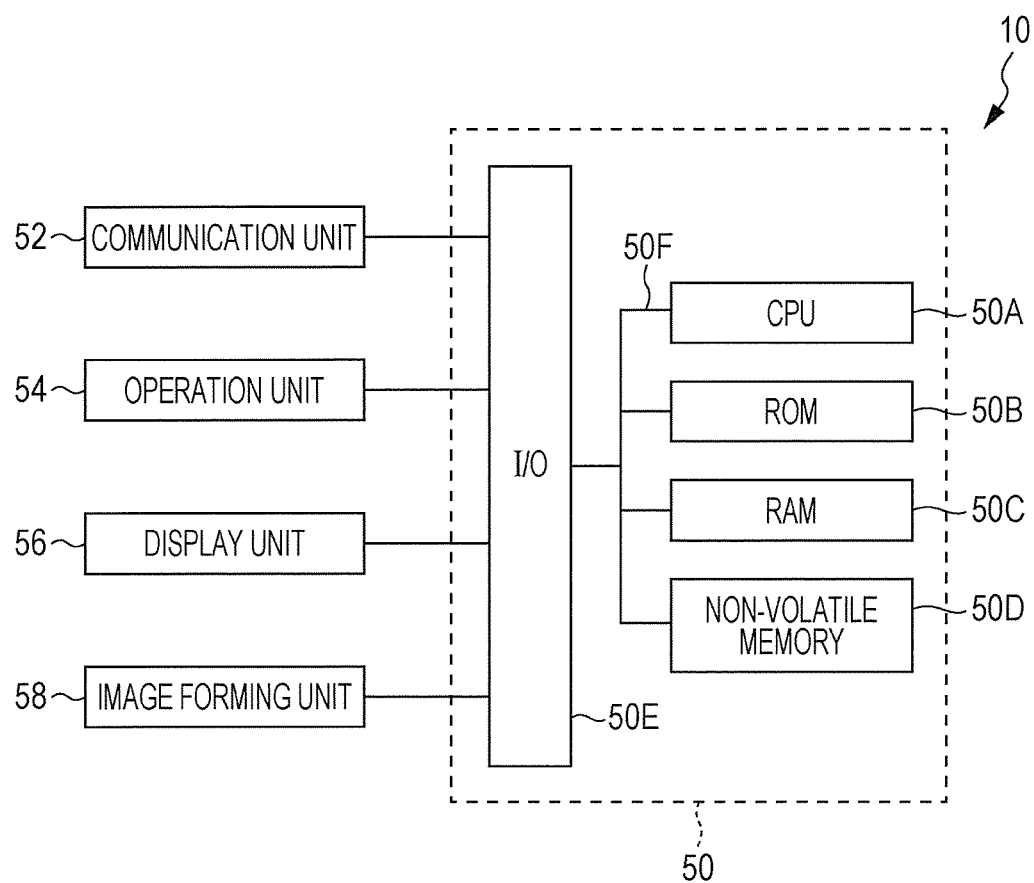
FIG. 3 is a diagram illustrating a primary configuration example of an electrical system in the information processing device.

FIG. 3 is a diagram illustrating a primary configuration example of an electrical system in the information processing device 10. The information processing device 10 is implemented using, for instance, a computer 50.

The computer 50 includes: a central processing unit (CPU) 50A which is an example of a processor that implements the functions associated with the information processing device 10; a read only memory (ROM) 50B that stores an information processing program for causing the computer 50 to function as the information processing device 10; a random access memory (RAM) 50C that is used as a temporary work area for the CPU 50A; a non-volatile memory 50D; and an input/output interface (I/O) 50E. The CPU 50A, the ROM 50B, the RAM 50C, the non-volatile memory 50D, and the I/O 50E are connected to each other via a bus 50F.

The non-volatile memory 50D is an example of a storage device that holds stored information even when electric power supplied to the non-volatile memory 50D is cut off. For instance, a semiconductor memory is used, but a hard disk may be used. The non-volatile memory 50D is not necessarily built in the computer 50, and may be a portable memory medium, such as a USB memory or a memory card, detachably attached to the computer 50.

The I/O 50E is connected to, for instance, a communication unit 52, an operation unit 54, a display unit 56, and an image forming unit 58.

The communication unit 52 is connected to the internal line 2, and includes a communication protocol for performing data communication with the mediation device 20.

The operation unit 54 is a unit that receives instructions from a user, and notifies the CPU 50A of the instructions. For instance, a button, a touch panel, a keyboard, and a mouse are used. When instructions are given by voice, a microphone may be used as the operation unit 54.

The display unit 56 is a device that displays information processed by the CPU 50A. For instance, a liquid-crystal display and an organic electro luminescence (EL) display are used.

The image forming unit 58 is a unit that forms an image on a recording medium in accordance with the instructions of the CPU 50A which executes an application, the image being specified by a user. Any image forming method may be used by the image forming unit 58, and for instance, an electrophotographic system or an inkjet system is used.

Figure 4:
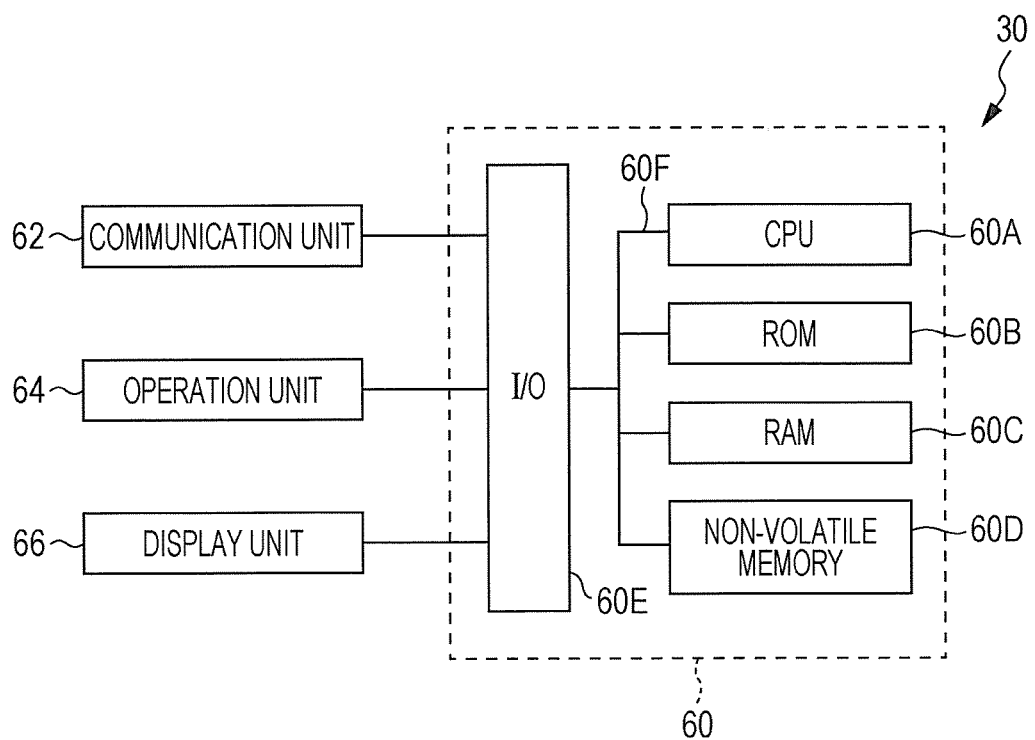
FIG. 4 is a diagram illustrating a primary configuration example of an electrical system in a management server.

FIG. 4 is a diagram illustrating a primary configuration example of an electrical system in the management server 30. The management server 30 is implemented using, for instance, a computer 60.

The computer 60 includes: a central processing unit 60A which is an example of a processor that implements the functions associated with the management server 30; a ROM 60B that stores a management program for causing the computer 60 to function as the management server 30; a RAM 60C that is used as a temporary work area for the CPU 60A; a non-volatile memory 60D; and an I/O 60E. The CPU 60A, the ROM 60B, the RAM 60C, the non-volatile memory 60D, and the I/O 60E are connected to each other via a bus 60F.

The I/O 60E is connected to, for instance, a communication unit 62, an operation unit 64, and a display unit 66.

The communication unit 62 is connected to the public line 3 and the internal line 4, and includes a communication protocol for performing data communication with the mediation device 20 and the authentication server 40.

The operation unit 64 is a unit that receives instructions from an administrator, and notifies the CPU 60A of the instructions. For instance, a button, a touch panel, a keyboard, and a mouse are used. When instructions are given by voice, a microphone may be used as the operation unit 64.

The display unit 66 is a device that displays information processed by the CPU 60A. For instance, a liquid-crystal display and an organic EL display are used.

It is to be noted that a primary configuration example of an electrical system in the mediation device 20 and the authentication server 40 has the same configuration as that of the primary configuration example of the electrical system in the management server 30 illustrated in FIG. 4, thus, a description is omitted.

Next, the operation of the information processing device 10 will be described.

Figure 5:
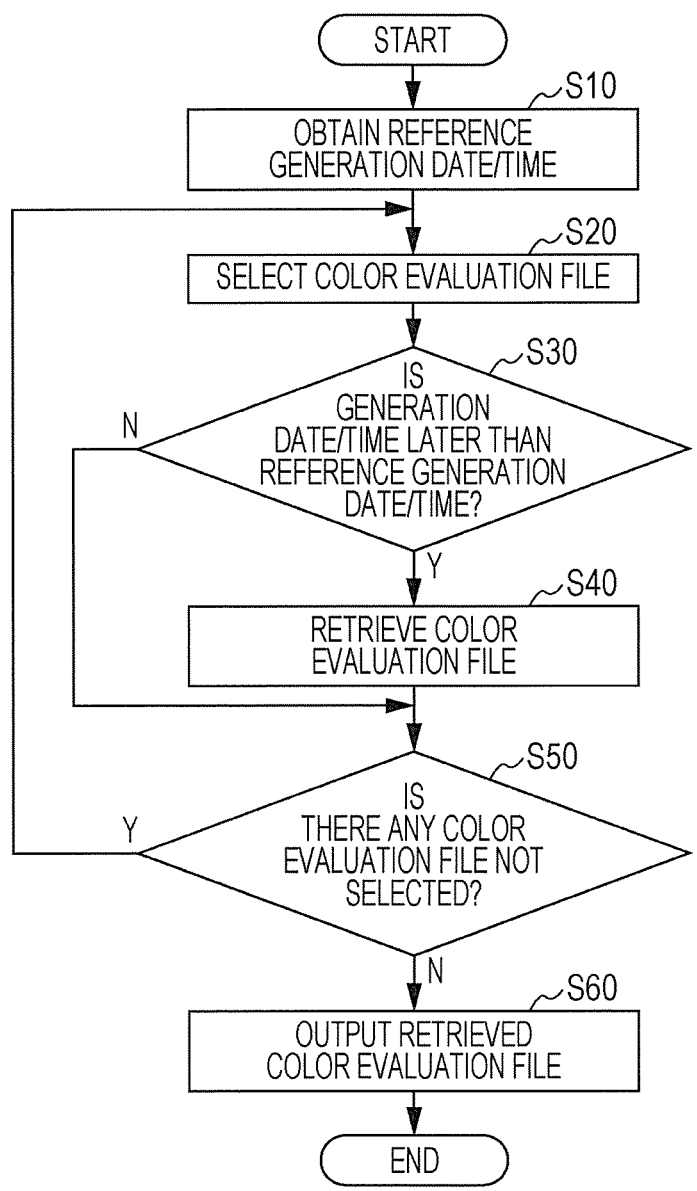
FIG. 5 is a flowchart illustrating an example of a flow of output processing executed by the information processing device.

FIG. 5 is a flowchart illustrating an example of a flow of color evaluation file output processing performed by the CPU 50A of the information processing device 10. An information processing program that defines the control processing is pre-stored, for instance, in the ROM 50B of the information processing device 10. The CPU 50A of the information processing device 10 reads the information processing program stored in the ROM 50B, and executes the control processing. The CPU 50A may execute the control processing illustrated in FIG. 6 at any timing, and as an example, the CPU 50A executes the control processing subsequently after the color evaluation processing is executed. An information processing program that defines the output processing is pre-stored, for instance, in the ROM 50B of the information processing device 10. The CPU 50A of the information processing device 10 reads the information processing program stored in the ROM 50B, and executes the output processing. The CPU 50A may execute the output processing illustrated in FIG. 5 at any timing, and for instance, when instructions are given by a user via the operation unit 54, the CPU 50A executes the output processing.

It is assumed that the information processing device 10 is notified of reference generation date/time from the management server 30 through the issuance of a license, and the non-volatile memory 50D stores multiple color evaluation files respectively generated by color evaluation processing repeatedly executed by the information processing device 10.

In step S10, the CPU 50A obtains the reference generation date/time of the most recent license received from the management server 30.

In step S20, the CPU 50A selects one of the color evaluation files generated so far.

In step S30, the CPU 50A determines whether or not the generation date/time of the color evaluation file selected in step S20 is later than the reference generation date/time obtained in step S10. The generation date/time of the selected color evaluation file later than the reference generation date/time indicates that the selected color evaluation file is generated later than the reference generation date/time. In other words, the selected color evaluation file is a color evaluation file which has not been managed by the management server 30. Thus, the flow proceeds to step S40, and in step S40, the CPU 50A retrieves the selected color evaluation file, and stores it in the RAM 50C, for instance.

On the other hand, when the generation date/time of the selected color evaluation file is determined to be earlier than the reference generation date/time, the flow proceeds to step S50 without executing the processing in step S40. In other words, the CPU 50A does not retrieve any color evaluation which is among the color evaluation files generated so far and already managed by the management server 30.

In step S50, the CPU 50A determines whether or not there is any color evaluation file which has not been selected in the non-volatile memory 50D. When there is a color evaluation file which has not been selected, the flow proceeds to step S20, and in step S20, the CPU 50A selects one of the color evaluation files which have not been selected. The processing in steps S20 to S50 is repeatedly executed until it is determined in the determination processing in step S50 that no color evaluation file is present which has not been selected, thus in step S40, those color evaluation files with generation date/time later than the reference generation date/time are retrieved from multiple color evaluation files respectively generated in color evaluation processing.

On the other hand, when it is determined in step S50 that there is no color evaluation file which has not been selected in the non-volatile memory 50D, the flow proceeds to step S60.

In step S60, the CPU 50A controls the communication unit 52 to transmit the color evaluation file retrieved in the RAM 50C in step S40 to the management server 30, then the output processing illustrated in FIG. 5 is completed.

When the information processing device 10 is in a stand-alone state, the CPU 50A may output the color evaluation file retrieved in the RAM 50C in step S40 to a portable semiconductor memory attached, for instance, to an external terminal (not illustrated) of the information processing device 10, and a user may attach the semiconductor memory storing the color evaluation file to an external terminal (not illustrated) of the mediation device 20, and the color evaluation file outputted by the information processing device 10 may be transferred to the mediation device 20.

In the mediation device 20 which has received the color evaluation file, as already described, user authentication is performed, then a user performs an operation of transmitting the color evaluation file to the management server 30, thus the color evaluation file outputted by the information processing device 10 is transmitted to the management server 30.

Figure 6:
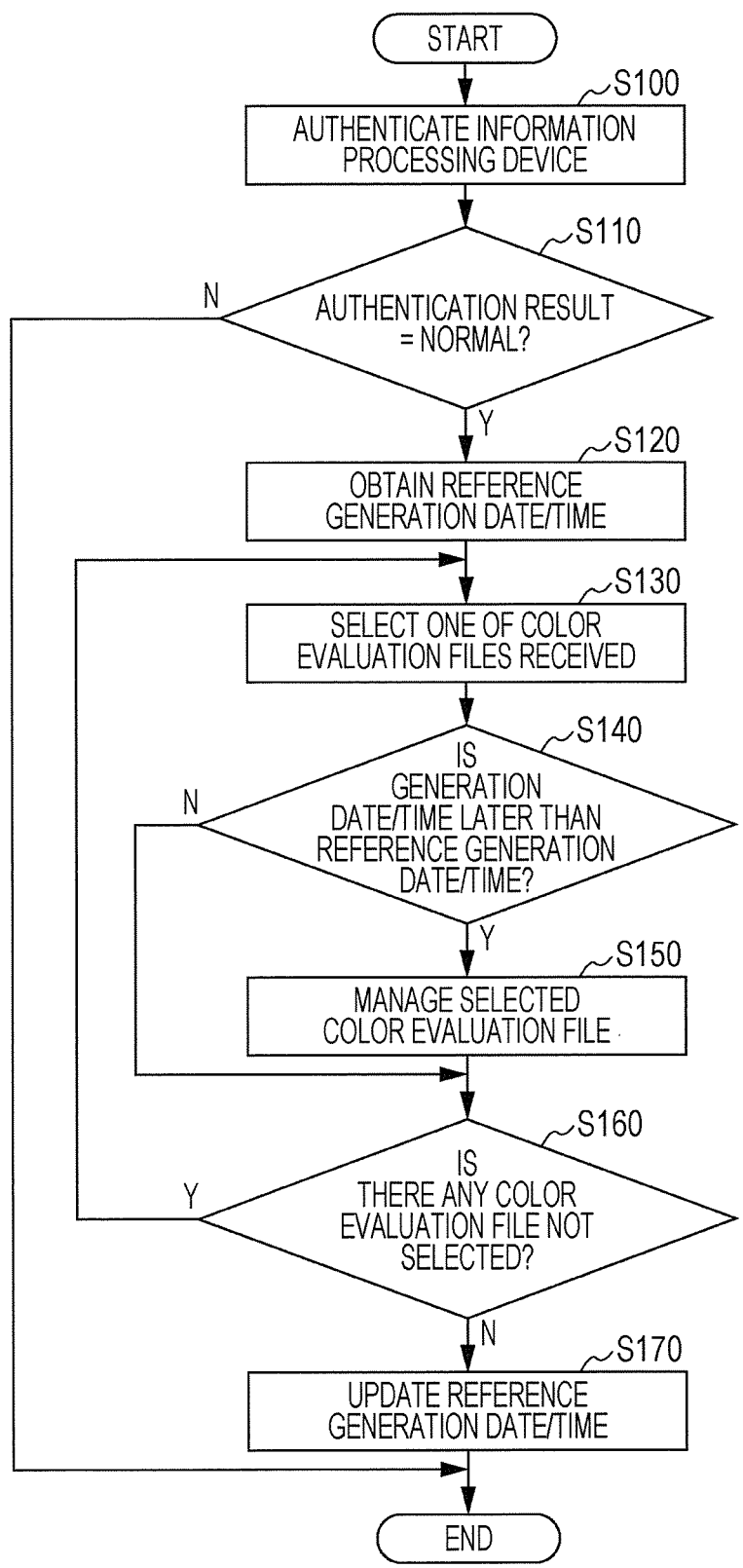
FIG. 6 is a flowchart illustrating an example of a flow of management processing executed by the management device.

Meanwhile, FIG. 6 is a flowchart illustrating an example of a flow of management processing executed by the CPU 60A of the management server 30 when the mediation device 20 requests user authentication to transmit the color evaluation file. A management program that defines the management processing is pre-stored, for instance, in the ROM 60B of the management server 30. The CPU 60A of the management server 30 reads the management program stored in the ROM 60B, and executes the management processing.

It is assumed that the non-volatile memory 60D of the management server 30 stores the reference generation date/time of each color evaluation file already managed by the management server 30, and the reference generation date/time is included in the most recent license transmitted to the information processing device 10 which has transmitted the color evaluation file.

In step S100, the CPU 60A controls the communication unit 62 to transmit the authentication information received from the mediation device 20 to the authentication server 40, and authentication of the information processing device 10 is performed.

As the authentication information, for instance, device identifier, such as a product serial number of the information processing device 10, which is uniquely assigned to the information processing device 10, or a user identifier, such as a user identification (ID), which is uniquely assigned to the user who has operated the mediation device 20 to transmit a color evaluation file is used.

In step S110, when the authentication information received from the authentication server 40 is not normal, specifically, when the authentication information received from the mediation device 20 does not match any of the authentication information registered in the authentication server 40, the CPU 60A determines that a connection request has been made by another user different from the user of the information processing device 10 which is a management target of the management server 30, and completes the management processing illustrated in FIG. 6. In other words, when a connection request is made by the user of an information processing device 10 which is not a management target of the management server 30, the CPU 60A rejects the connection request.

On the other hand, when the authentication information received from the authentication server 40 is normal, specifically, when the authentication information received from the mediation device 20 matches one of the authentication information registered in the authentication server 40, the connection request from the user is accepted, and the flow proceeds to step S120.

After authentication of the user is completed in the management server 30, in step S120, the CPU 60A obtains the reference generation date/time of the color evaluation file already managed by the management server 30. In addition, the CPU 60A uses the obtained reference generation date/time to identify each color evaluation file which is not yet a management target among the color evaluation files newly received from the information processing device 10.

Specifically, in step S130, the CPU 60A selects one of the color evaluation files newly received from the information processing device 10.

In step S140, the CPU 60A determines whether or not the generation date/time of the color evaluation file selected in step S130 is later than the reference generation date/time obtained in step S120.

The generation date/time of the selected color evaluation file later than the reference generation date/time indicates that the selected color evaluation file has not been managed by the management server 30. Thus, the flow proceeds to step S150.

In step S150, the CPU 60A stores in the non-volatile memory 60D a color evaluation file having generation date/time determined to be later than the reference generation date/time, and manages the selected color evaluation file.

On the other hand, when the generation date/time of the selected color evaluation file is determined to at or earlier than the reference generation date/time in the determination processing in step S140, the selected color evaluation file is already managed by the management server 30. Thus, the flow proceeds to step S160 without executing the processing in step S150.

In step S160, the CPU 60A determines whether or not there is any color evaluation file which has not been selected among the color evaluation files newly received from the information processing device 10. When there is a color evaluation file which has not been selected, the flow proceeds to step S130, and in step S130, the CPU 60A selects one of the color evaluation files which have not been selected. The processing in steps S130 to S160 is repeatedly executed until it is determined in the determination processing in step S160 that no color evaluation file is present which has not been selected, thus only those color evaluation files not yet managed by the management server 30 are retrieved from the color evaluation files newly received from the information processing device 10, and are stored in the non-volatile memory 60D. Then the management server 30 starts to manage those color evaluation files.

On the other hand, when it is determined in the determination processing in step S160 that no color evaluation file is present which has not been selected among the color evaluation files newly received from the information processing device 10, the flow proceeds to step S170.

In step S170, the CPU 60A updates the reference generation date/time to a new reference generation date/time which is the generation date/time of the color evaluation file generated most recently in the information processing device 10 among the newly managed color evaluation files, and completes the management processing illustrated in FIG. 6.

Figure 7:
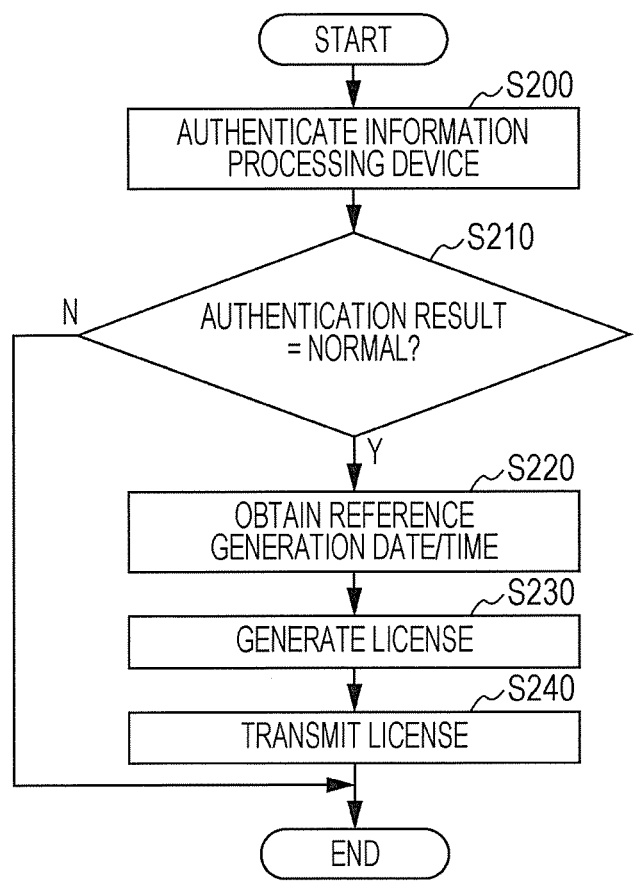
FIG. 7 is a flowchart illustrating an example of a flow of license issuance processing executed by the management device.

Meanwhile, FIG. 7 is a flowchart illustrating an example of a flow of license issuance processing executed by the CPU 60A of the management server 30 when a license issuance request is received from the information processing device 10 through the mediation device 20. A management program that defines the license issuance processing is pre-stored, for instance, in the ROM 60B of the management server 30. The CPU 60A of the management server 30 reads the management program stored in the ROM 60B, and executes the license issuance processing.

In step S200, the CPU 60A controls the communication unit 62 to transmit the authentication information received from the mediation device 20, and performs authentication of the information processing device 10 which attempts to transmit information.

In step S210, the CPU 60A determines whether or not an authentication result received from the authentication server 40 is normal. When the authentication result is not normal, the CPU 60A determines that a connection request has been made by another user different from the user of the information processing device 10 which is a management target of the management server 30, and completes the license issuance processing illustrated in FIG. 7.

On the other hand, when the authentication result received from the authentication server 40 is normal, the connection request from the user is accepted, and the flow proceeds to step S220.

In step S220, the CPU 60A obtains the reference generation date/time of a color evaluation file associated with the information processing device 10 which has made the license issuance request.

In step S230, the CPU 60A generates a license which sets the reference generation date/time obtained in step S220 and a new expiration time for the application installed in the information processing device 10 which has transmitted the license issuance request.

In step S240, the CPU 60A transmits the license generated in step S230 to the mediation device 20 to notify the information processing device 10 transmitted the license issuance request of the license through the mediation device 20, and completes the license issuance processing illustrated in FIG. 7.

Consequently, in the information processing device 10, use of the application is extended until a new expiration time of the application, included in the license of which the management server 30 is notified.

For instance, when the period before the expiration time of the application set in the license is one month, the information processing device 10 transmits a license issuance request to the management server 30 every month in order to use the application subsequently, thus the license is also transmitted to the information processing device 10 every month. Thus, the reference generation date/time is transmitted from the management server 30 to the information processing device 10 along with regular information which is sent regularly. Thus, the load of the information processing device 10 and the management server 30 as well as the amount of traffic on the internal line 2 and the public line 3 are reduced, as compared with when the management server 30 transmits the reference generation date/time and the license to the information processing device 10 separately.

When the reference generation date/time included in a new license transmitted from the management server 30 is earlier than the reference generation date/time set in the information processing device 10 before the new license is received, in other words, when the range of the color evaluation files managed by the management server 30 is smaller than the range at the time when the previous license is received, it is probable that an abnormality has occurred in the management of the color evaluation files in the management server 30. Thus, in this case, the information processing device 10 may output a warning.

The manner of output of a warning is not restricted, and for instance, a warning may be outputted by the voice, and in addition, a warning may be displayed on the display unit 58 of the information processing device 10.

FIGS. 8 to 11 each illustrate an example of a situation of management of color evaluation files conducted in the information processing system 1 described above.

FIG. 8 illustrates a management situation example of color evaluation files in the following case: the information processing device 10 performs the output processing illustrated in FIG. 5 twice during execution of the application, transmits a license issuance request to the management server 30 to obtain a new license, then additionally performs the output processing illustrated in FIG. 5 once.

Specifically, at the time when the first output processing is performed, it is assumed that the reference generation date/time set in the information processing device 10 is "9/3/2019 10:00", and the generation date/times of three color evaluation files generated by the color evaluation processing executed later the reference generation date/times are "9/4/2019 10:00", "9/5/2019 10:00", and "9/6/2019 10:00", respectively. In this case, since the generation date/times of the three color evaluation files are later than the reference generation date/time, all the three color evaluation files are retrieved as output targets, and transmitted from the mediation device 20 to the management server 30.

Upon receiving the color evaluation file, the management server 30 executes the management processing illustrated in FIG. 6, and since the reference generation date/time set in the management server 30 is also "9/3/2019 10:00", all the three received color evaluation files are each treated as a management target. In this case, due to step S170 of FIG. 6, the management server 30 sets a new reference generation date/time to the generation date/time of the color evaluation file which is among the color evaluation files newly managed and generated most recently in the information processing device 10. Thus, in the management server 30, the new reference generation date/time is set to "9/6/2019 10:00".

However, after the update of the reference generation date/time in the management server 30, a license issuance request is not made by the information processing device 10, thus the information processing device 10 is not notified of the reference generation date/time after the update, and the reference generation date/time remains to be set to "9/3/2019 10:00" in the information processing device 10.

It is assumed that before the second output processing is performed, color evaluation files with the generation date/times set to "9/7/2019 10:00" and "9/8/2019 10:00" are further generated in the information processing device 10. When the information processing device 10 executes the second output processing in this state, in addition to the three color evaluation files retrieved in the first output processing, the color evaluation files with the generation date/times set to "9/7/2019 10:00" and "9/8/2019 10:00" are retrieved as the output targets, and transmitted from the mediation device 20 to the management server 30.

In the management server 30 which has received the color evaluation files, the reference generation date/time set in the management server 30 is "9/6/2019 10:00". Thus, only those color evaluation files with the generation date/times set to "9/7/2019 10:00" and "9/8/2019 10:00" are retrieved from the received color evaluation files, and each treated as a management target. In addition, the new reference generation date/time is set to "9/8/2019 10:00" in the management server 30.

Subsequently, when the information processing device 10 transmits a license issuance request to the management server 30, the license issuance processing illustrated in FIG. 7 is executed in the management server 30. Thus, the information processing device 10 is notified of a new license, and the reference generation date/time set in the information processing device 10 is updated to "9/8/2019 10:00" which is the same as the reference generation date/time set in the management server 30.

It is assumed that before the third output processing is performed, color evaluation files with the generation date/times set to "9/8/2019 17:00", "9/9/2019 13:00", and "9/9/2019 17:00" are further generated in the information processing device 10. When the information processing device 10 executes the third output processing in this state, since the reference generation date/time is set to "9/8/2019 10:00" this time, only those color evaluation files with the generation date/times set to "9/8/2019 17:00", "9/9/2019 13:00", and "9/9/2019 17:00" are retrieved as the output targets, and transmitted from the mediation device 20 to the management server 30.

Since the reference generation date/time set in the management server 30 is also "9/8/2019 10:00", the management server 30 treats all the three received color evaluation files as a management target, then updates the reference generation date/time to "9/9/2019 17:00".

FIG. 8 illustrates a management situation example of color evaluation files when a license issuance request is made between the second output processing and the third output processing, whereas FIG. 9 illustrates a management situation example of color evaluation files when a license issuance request is not made, and the third output processing is executed in the information processing device 10.

Since a license issuance request is not made after the second output processing, at the time when the third output processing is executed, the reference generation date/time set in the information processing device 10 remains to be "9/3/2019 10:00".

Thus, when the information processing device 10 executes the third output processing in this state, in addition to the color evaluation files retrieved in the first and second output processing, the color evaluation files with the generation date/times set to "9/8/2019 17:00", "9/9/2019 13:00", and "9/9/2019 17:00" are retrieved as the output targets, and transmitted from the mediation device 20 to the management server 30.

In the management server 30 which has received the color evaluation files, since the reference generation date/time set in the management server 30 is "9/8/2019 10:00", only those color evaluation files with the generation date/times set to "9/8/2019 17:00", "9/9/2019 13:00", and "9/9/2019 17:00" are retrieved from the received color evaluation files, and each treated as a management target. In addition, a new reference generation date/time is set to "9/9/2019 17:00" in the management server 30.

FIG. 10 is a table illustrating a situation in which in the management situation example of color evaluation files illustrated in FIG. 8, when the first output processing is executed in the information processing device 10, a user forgets to transmit a color evaluation file from the mediation device 20 to the management server 30, the color evaluation file being outputted from the information processing device 10. Therefore, a symbol "-" indicating that there is no corresponding color evaluation file is set in the generation date/time column of the color evaluation file outputted from the mediation device 20 in the first output processing of FIG. 10.

Since no color evaluation file is transmitted to the management server 30 in the first output processing, even after the completion of the first output processing, the reference generation date/time set in the management server 30 remains to be "9/3/2019 10:00" which is the same as the reference generation date/time set in the information processing device 10.

When the information processing device 10 executes the second output processing in this situation, in addition to the three color evaluation files retrieved in the first output processing, the color evaluation files with the generation date/times set to "9/7/2019 10:00" and "9/8/2019 10:00" are retrieved as the output targets, and transmitted from the mediation device 20 to the management server 30.

In the management server 30 which has received the color evaluation files, since the reference generation date/time set in the management server 30 is "9/6/2019 10:00", all the received color evaluation are retrieved, and each treated as a management target. In addition, a new reference generation date/time is set to "9/8/2019 10:00" in the management server 30.

FIG. 11 is a table illustrating a management situation example of color evaluation files when the information processing device 10 makes a license issuance request between the first output processing and the second output processing in the management situation example of color evaluation files illustrated in FIG. 10.

After a user forgets to transmit a color evaluation file outputted from the information processing device 10 in the first output processing to the management device 30 from the mediation device 20, even when the information processing device 10 transmits a license issuance request to the management server 30, the reference generation date/time has not been updated in the management server 30, thus the reference generation date/time set in a new license is "9/3/2019 10:00", and the reference generation date/time set in the information processing device 10 remains to be "9/3/2019 10:00".

Therefore, in the second output processing, the processing same as the second output processing in FIG. 10 is executed, and all the color evaluation files outputted in the second output processing are each treated as a management target, and managed in the management server 30.

In this manner, among the color evaluation files repeatedly generated by an application, the information processing device 10 outputs only those color evaluation files generated after the reference generation date/time set in the most recent license received last, and a user transmits the color evaluation files outputted by the information processing device 10 to the management server 30 from the mediation device 20.

The management server 30 retrieves those color evaluation files with generation date/time later than the reference generation date/time from the color evaluation files received from the information processing device 10 through the mediation device 20, sets a new reference generation date/time to the generation date/time of the color evaluation file generated most recently by the information processing device 10 among the retrieved color evaluation files, and stores the retrieved color evaluation files in the non-volatile memory 60D to manage the color evaluation files.

Thus, when a user instructs the information processing device 10 to transmit color evaluation files, the information processing device 10 does not have to transmit all the color evaluation files generated so far. Transmitting the color evaluation files with generation date/time later than the reference generation date/time allows all the color evaluation files generated in the information processing device 10 to be reliably managed by the management server 30 without redundancy.

In the exemplary embodiment described above, an example has been described in which when instructions are given by a user, the information processing device 10 executes the output processing. However, the information processing device 10 may execute the output processing along with the transmission of a license issuance request, and may output color evaluation files along with the license issuance request. By combining the license issuance request and the color evaluation files, the load of the information processing device 10 and the management server 30 as well as the amount of traffic on the internal line 2 and the public line 3 are reduced, as compared with when the information processing device 10 transmits the license issuance request and the color evaluation files separately.

In the present exemplary embodiment, the color evaluation files outputted by the information processing device 10 and the color evaluation files managed by the management server 30 are retrieved by referring to the generation date/time of color evaluation files. However, information to be referred in this case is not limited to the generation date/time of each color evaluation file. Any type of information may be used, as long as the information can identify the range of color evaluation files which are managed by the management server 30. For instance, the generation number of a color evaluation file assigned with a serial number in the order of generation may be referred to. For instance, when the generation number of a color evaluation file set in a license is "10", it is seen that the color evaluation files each with a generation number up to "10" are managed by the management server 30. Thus, the information processing device 10 only have to output the color evaluation files each with a generation number of "11" or greater.

In addition, in the present exemplary embodiment, an example has been described in which when the information processing device 10 is an image forming device, color evaluation files generated by the color evaluation processing repeatedly executed are managed by the management server 30. However, the information processing device 10 described above may be any type of device as long as the device provides a service to users. For instance, the device may be an inspection device that inspects the products manufactured in a factory or the like. Since the inspection device respectively inspects the products repeatedly, inspection processing to inspect the products is an example of the specific processing. The inspection data of each product generated by the inspection processing is an example of information on the specific processing.

When the output processing illustrated in FIG. 5, the management processing illustrated in FIG. 6, and the license issuance processing illustrated in FIG. 7 are applied to an information processing system 1 including a management server 30 that manages the inspection data of each product, and an inspection device which is an example of the information processing device 10, even when the inspection data of all products inspected by the inspection device is not outputted to the management server 30 every time, the inspection data of all products inspected by the inspection device is reliably managed by the management server 30 without redundancy in an integrated manner.

The information processing device 10 may be a cash register used for checkout of products purchased by customers. Since a cash register performs calculation processing every day to output daily sales volume, the calculation processing is an example of the specific processing. In addition, sales volume data outputted by the calculation processing is an example of information on the specific processing.

When the output processing illustrated in FIG. 5, the management processing illustrated in FIG. 6, and the license issuance processing illustrated in FIG. 7 are applied to an information processing system 1 including a management server 30 that manages daily sales volume, and a cash register which is an example of the information processing device 10, even when all sales volumes stored in the cash register are not outputted to the management server 30 every time, all sales volume data generated by the cash register is reliably managed by the management server 30 without redundancy in an integrated manner.

Although the present disclosure has been described above using the exemplary embodiment, the present disclosure is not limited to the scope of the described exemplary embodiment. Various changes and improvements may be made on the exemplary embodiment in a range not departing from the spirit of the present disclosure, and the changed or improved exemplary embodiment is also included in the technical scope of the present disclosure. For instance, the order of processing may be changed in a range not departing from the spirit of the present disclosure.

In the present exemplary embodiment, as an example, a mode in which the control processing and the management processing are implemented by software has been described. However, processing equivalent to the flowchart illustrated in FIGS. 6 and 10 may be implemented in an application specific integrated circuit (ASIC), a field programmable gate array (FPGA), or a programmable logic device (PLD), and the processing may be performed by hardware. In this case, the processing can be sped up, as compared with the control processing and the management processing are each implemented by software.

In this manner, at least one of the CPU 50A and the CPU 60A may be replaced by a dedicated processor focused on specific processing, such as an ASIC, an FPGA, a PLD, a graphics processing unit (GPU), and a floating point unit (FPU).

In addition to the mode in which the operations of the CPU 50A and the CPU 60A in the exemplary embodiment are implemented by one CPU 50A and one CPU 60A, respectively, the operations of the CPU 50A and the CPU 60A may be implemented by multiple CPUs 50A and multiple CPUs 60A, respectively. Furthermore, the operation of the CPU 50A and the CPU 60A in the exemplary embodiment may be implemented by the CPUs 50A of multiple computers 50 in collaboration which are located physically apart from each other and the CPUs 60A of multiple computers 60 in collaboration which are located physically apart from each other, respectively.

In the aforementioned exemplary embodiment, a mode has been described, in which the information processing program is installed in the ROM 50B, and the management program is installed in the ROM 60B. However, without being limited to this, the programs according to the present disclosure may be provided in a form recorded in a computer-readable recording medium. For instance, the programs according to the present disclosure may be provided in a form recorded in an optical disc, such as a compact disc (CD)-ROM, or a digital versatile disc (DVD)-ROM. Alternatively, the programs according to the present disclosure may be provided in a form recorded in a semiconductor memory.

In addition, the information processing device 10 may obtain the information processing program according to the present disclosure from another device connected to the internal line 2 or another device connected to the public line 3 through the mediation device 20. Alternatively, the management server 30 may obtain the management program according to the present disclosure from another device connected to the internal line 4 or another device connected to the public line 3.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A management device comprising
a processor configured to when transferring data to and from an information processing device, not connected to a communication line, which repeatedly generates information on each specific processing, notify the information processing device of management information through a mediation device connected to the communication line, the management information indicating a range of the information on the specific processing, the information being a management target, for the management information of which the information processing device is notified, obtain information which is among information received from the information processing device through the mediation device and not yet a management target, and newly manage the obtained information, and update the management information so that the newly managed information is treated as a management target.

2. The management device according to claim 1, wherein the processor uses the management information to identify information which is not yet a management target from information received from the information processing device.

3. The management device according to claim 1, wherein the processor notifies the information processing device of the updated management information along with regular information repeatedly transmitted to the information processing device.

4. The management device according to claim 2, wherein the processor notifies the information processing device of the updated management information along with regular information repeatedly transmitted to the information processing device.

5. The management device according to claim 3, wherein the regular information indicates an expiration time of an application which repeatedly generates information in the information processing device.

6. The management device according to claim 1, wherein before receiving the information generated by the information processing device, the processor receives authentication information for verifying whether or not the information processing device as a transmission source of the information is a management target, and when authentication information same as the authentication information is already registered, obtains information which is among the information received from the information processing device and not yet a management target, and newly manages the obtained information.

7. The management device according to claim 6, wherein the authentication information is a device identifier uniquely assigned to the information processing device, or a user identifier uniquely assigned to a user who operates the mediation device to transmit the information generated by the information processing device.

8. The management device according to claim 1, wherein the management information is generation date/time of information which is a management target and generated by the specific processing most recently in the information processing device, and the processor updates the management information so that generation date/time of the information indicated by the management information is the generation date/time of information which is among the newly managed information and generated most recently by the information processing device.

9. The management device according to claim 2, wherein the management information is generation date/time of information which is a management target and generated by the specific processing most recently in the information processing device, and the processor updates the management information so that generation date/time of the information indicated by the management information is the generation date/time of information which is among the newly managed information and generated most recently by the information processing device.

10. The management device according to claim 3, wherein the management information is generation date/time of information which is a management target and generated by the specific processing most recently in the information processing device, and the processor updates the management information so that generation date/time of the information indicated by the management information is the generation date/time of information which is among the newly managed information and generated most recently by the information processing device.

* * * * *